US010935636B2

(12) United States Patent
Yoshino

(10) Patent No.: US 10,935,636 B2
(45) Date of Patent: Mar. 2, 2021

(54) LASER SCANNER

(71) Applicant: TOPCON Corporation, Tokyo-to (JP)

(72) Inventor: Ken-ichiro Yoshino, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 463 days.

(21) Appl. No.: 15/936,945

(22) Filed: Mar. 27, 2018

(65) Prior Publication Data

US 2018/0292514 A1 Oct. 11, 2018

(30) Foreign Application Priority Data

Apr. 5, 2017 (JP) .............................. JP2017-075434

(51) Int. Cl.
| | | |
|---|---|---|
| *G01C 3/08* | (2006.01) | |
| *G01S 7/48* | (2006.01) | |
| *G01S 17/08* | (2006.01) | |
| *G01S 7/481* | (2006.01) | |
| *G01S 7/497* | (2006.01) | |
| *G01S 17/89* | (2020.01) | |

(52) U.S. Cl.
CPC .......... *G01S 7/4808* (2013.01); *G01S 7/4817* (2013.01); *G01S 7/497* (2013.01); *G01S 17/08* (2013.01); *G01S 17/89* (2013.01)

(58) Field of Classification Search
CPC ........ G01S 7/4808; G01S 7/497; G01S 17/89; G01S 17/08; G01S 7/4817
See application file for complete search history.

(56) References Cited

U.S. PATENT DOCUMENTS

| | | | | |
|---|---|---|---|---|
| 6,331,710 | B1 * | 12/2001 | Wang | G02B 13/143 |
| | | | | 250/492.2 |
| 6,922,251 | B1 * | 7/2005 | Kirchhoff | C21C 5/44 |
| | | | | 356/601 |
| 2003/0090646 | A1 * | 5/2003 | Riegl | G01S 17/89 |
| | | | | 356/3 |
| 2011/0261368 | A1 * | 10/2011 | Ohtomo | G02B 26/105 |
| | | | | 356/607 |

(Continued)

FOREIGN PATENT DOCUMENTS

| | | |
|---|---|---|
| JP | 2001-255144 A | 9/2001 |
| JP | 2008-241273 A | 10/2008 |
| JP | 2014-85134 A | 5/2014 |

*Primary Examiner* — Samantha K Abraham
(74) *Attorney, Agent, or Firm* — Nields, Lemack & Frame, LLC

(57) ABSTRACT

A laser scanner comprises a distance measuring component for measuring a distance to a measuring point, a frame unit which horizontally rotates, a scanning mirror which scans a distance measuring light by rotating vertically, angle detecting components for detecting a horizontal angle of the frame unit and a vertical angle of the scanning mirror and an arithmetic control component, wherein the arithmetic control component sets a distance between measuring points adjacent in a radial direction as a first distance between measuring points, sets a distance between measuring points adjacent in a circumferential direction as a second distance between measuring points, calculates a first interval of measuring angles which becomes the first distance between measuring points and a second interval of measuring angles which becomes the second distance between measuring points at a measuring point and acquires point cloud data of a plane to be measured based on the first interval of measuring angles and the second interval of measuring angles.

9 Claims, 4 Drawing Sheets

(56) References Cited

U.S. PATENT DOCUMENTS

| | | | |
|---|---|---|---|
| 2012/0105824 A1* | 5/2012 | Ohtomo | G01S 17/87 356/5.01 |
| 2012/0140244 A1* | 6/2012 | Gittinger | G01S 17/89 356/612 |
| 2013/0070250 A1* | 3/2013 | Ditte | G01C 22/02 356/445 |
| 2014/0009604 A1* | 1/2014 | Hinderling | G01C 15/002 348/142 |
| 2014/0063489 A1* | 3/2014 | Steffey | G01S 17/89 356/72 |
| 2014/0078519 A1* | 3/2014 | Steffey | G01S 7/4817 356/625 |
| 2014/0111618 A1 | 4/2014 | Kumagai et al. | |
| 2014/0300906 A1* | 10/2014 | Becker | G01S 17/42 356/614 |
| 2015/0029489 A1* | 1/2015 | Metzler | G01S 7/4817 356/4.01 |
| 2015/0042977 A1* | 2/2015 | Siercks | G01C 15/002 356/4.01 |
| 2015/0043009 A1* | 2/2015 | Bridges | G01S 17/36 356/610 |
| 2015/0085301 A1* | 3/2015 | Becker | G01B 11/002 356/608 |
| 2015/0098075 A1* | 4/2015 | Bestler | G01C 15/002 356/3.01 |
| 2015/0109627 A1* | 4/2015 | Bestler | G01S 17/06 356/614 |
| 2015/0185327 A1* | 7/2015 | Boeckem | G01C 1/02 356/4.01 |
| 2015/0293228 A1* | 10/2015 | Retterath | G01S 17/931 356/5.01 |
| 2015/0323350 A1* | 11/2015 | Kramer | G01D 5/3473 250/231.14 |
| 2015/0323354 A1* | 11/2015 | Kramer | G02B 17/08 250/231.14 |
| 2015/0323355 A1* | 11/2015 | Kramer | G01S 7/497 250/231.14 |
| 2016/0109560 A1* | 4/2016 | Yanobe | G01S 7/4817 356/4.01 |
| 2016/0259038 A1* | 9/2016 | Retterath | G01S 7/4815 |

\* cited by examiner

LASER SCANNER

BACKGROUND OF THE INVENTION

The present invention relates to a laser scanner for acquiring point cloud data.

A laser scanner obtains a three-dimensional shape of an object to be measured as point cloud data while scanning a distance measuring light in a vertical direction and rotating the distance measuring light in a horizontal direction.

In a case where a plane to be measured such as a horizontal ground surface, a horizontal road surface, or the like is measured by a laser scanner provided on a tripod, an interval of measuring points (distance between measuring points) adjacent in a circumferential direction (tangential direction) extends by a linear function of a distance from the laser scanner. On the other hand, an interval of measuring points (distance between measuring points) adjacent in a radial direction (radiation direction) extends by a quadratic function of the distance from the laser scanner.

Although a conventional laser scanner also has a function for independently setting an angular interval between the measuring points (interval of measuring angles) in the circumferential direction and in the radial direction, the conventional laser scanner generally performs a measurement at the same angular interval both in the circumferential direction and in the radial direction. Therefore, the conventional laser scanner sets the interval of the measuring angles in the radial direction so as to become an interval as desired with respect to a ground surface or a road surface, which is a plane to be measured, and sets the interval of the measuring angles in the circumferential direction at an angle as set.

However, as described above, the distance between the measuring points in the radial direction extends by the quadratic function of the distance from the laser scanner. As a result, in a case where a distance between the measuring points as desired is tried to obtain at a position away from the laser scanner, there is a need to narrow the interval of the measuring angles. In this case, the distance between the measuring points in the circumferential direction becomes extremely short, and the number of point cloud data to be acquired is increased. For this reason, it takes time to acquire the point cloud data, and a time and a load for a calculation using the point cloud data are increased.

SUMMARY OF THE INVENTION

It is an object of the present invention to provide a laser scanner which reduces the number of point cloud data to be acquired and realizes a reduction in a calculation load and a reduction in a processing time.

To attain the object as described above, a laser scanner according to the present invention comprises a distance measuring component for emitting a distance measuring light to a plane to be measured and for measuring a distance to a measuring point which the measuring light is emitted to, a frame unit which horizontally rotates around a horizontal rotation shaft as a center by a horizontal rotating motor, a scanning mirror of which height with respect to the plane to be measured is known and which is provided in the frame unit rotatably vertically around the vertical rotation shaft as the center and scans the distance measuring light by rotating vertically by a vertical rotating motor, a horizontal angle detecting component for detecting a horizontal angle of the frame unit, a vertical angle detecting component for detecting a vertical angle of the scanning mirror and an arithmetic control component for controlling a distance measurement by the distance measuring component and a rotation of the frame unit and a rotation of the scanning mirror, wherein the arithmetic control component sets a predetermined distance between measuring points adjacent along a radial direction as a first distance between measuring points, sets a predetermined distance between measuring points adjacent along a circumferential direction as a second distance between measuring points, calculates a first interval of measuring angles at which a distance between the measuring points adjacent along the radial direction becomes the first distance between measuring points at a measuring point, calculates a second interval of measuring angles at which a distance between the measuring points adjacent along the circumferential direction becomes the second distance between measuring points at the measuring point based on a height of the scanning mirror and a horizontal distance to the distance measuring point as desired, rotary emits the distance measuring light by horizontally rotating the frame unit and vertically rotating the scanning mirror and acquires point cloud data of the plane to be measured based on the first interval of measuring angles and the second interval of measuring angles.

Further, in the laser scanner according to a preferable embodiment, the arithmetic control component emits the distance measuring light to one arbitrary point on the plane to be measured and calculates the height of the scanning mirror with respect to the one arbitrary point based on a slope distance to the one arbitrary point and the vertical angle of the scanning mirror.

Further, in the laser scanner according to a preferable embodiment, the arithmetic control component scans the distance measuring light with respect to the plane to be measured, calculates the height of the scanning mirror and the horizontal distance with respect to each of the measuring points respectively based on a slope distance and at least the vertical angle of the scanning mirror for each of the measuring points and calculates an approximate shape of the plane to be measured based on the height of the scanning mirror and the horizontal distance for each of the measuring points.

Further, in the laser scanner according to a preferable embodiment, the first distance between measuring points and the second distance between measuring points at the measuring point as selected are coincided or approximately coincided with each other.

Furthermore, in the laser scanner according to a preferable embodiment, the arithmetic control component is configured so as not to acquire data of the measuring point which do not satisfy the first distance between measuring points.

According to the present invention, the laser scanner comprises a distance measuring component for emitting a distance measuring light to a plane to be measured and for measuring a distance to a measuring point which the measuring light is emitted to, a frame unit which horizontally rotates around a horizontal rotation shaft as a center by a horizontal rotating motor, a scanning mirror of which height with respect to the plane to be measured is known and which is provided in the frame unit rotatably vertically around the vertical rotation shaft as the center and scans the distance measuring light by rotating vertically by a vertical rotating motor, a horizontal angle detecting component for detecting a horizontal angle of the frame unit, a vertical angle detecting component for detecting a vertical angle of the scanning mirror and an arithmetic control component for controlling a distance measurement by the distance measuring component and a rotation of the frame unit and a rotation of the scanning mirror, wherein the arithmetic control component sets a predetermined distance between measuring points adjacent along a radial direction as a first distance between measuring points, sets a predetermined distance between measuring points adjacent along a circumferential direction as a second distance between measuring points, calculates a first interval of measuring angles at which a distance between the measuring points adjacent along the radial direction becomes the first distance between measuring points at a measuring point, calculates a second interval of measuring angles at which a distance between the measuring points adjacent along the circumferential direction becomes the second distance between measuring points at the measuring point based on a height of the scanning mirror and a horizontal distance to the distance measuring point as desired, rotary emits the distance measuring light by horizontally rotating the frame unit and vertically rotating the scanning mirror and acquires point cloud data of the plane to be measured based on the first interval of measuring angles and the second interval of measuring angles. As a result, the number of data to be acquired is greatly reduced, a time for acquiring the point cloud data and a calculation load in the arithmetic control component are reduced, and a processing time from a start of a distance measurement to an acquisition of the point cloud data enables to be greatly shortened.

DETAILED DESCRIPTION OF THE PREFERRED EMBODIMENT

A description will be given below on embodiments of the present invention by referring to the attached drawings.

Figure 1:
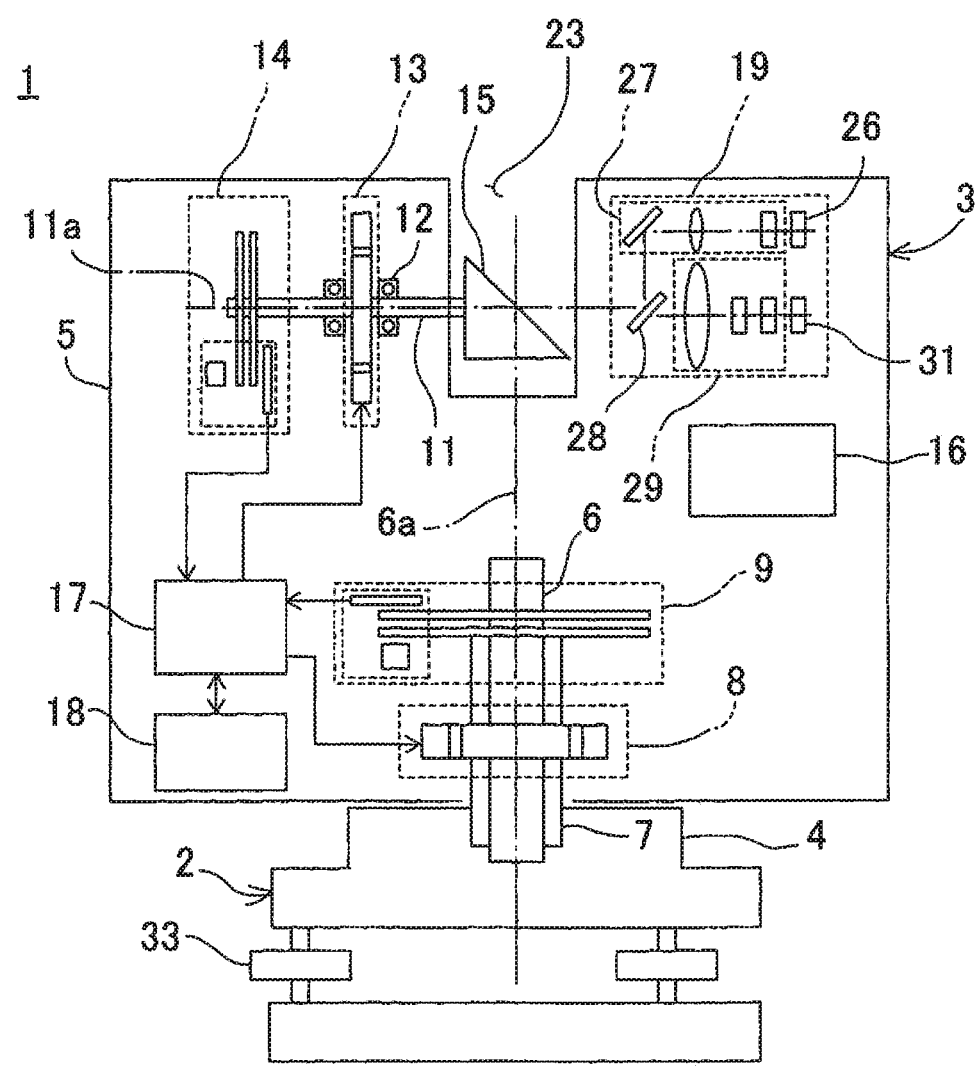
FIG. 1 is a frontal cross-sectional view to show a laser scanner according to an embodiment of the present invention.

First, in FIG. 1, a description will be given on a laser scanner according to embodiments of the present invention.

A laser scanner 1 is composed of a leveling unit 2 attached on a tripod (see FIG. 2) and a scanner main unit 3 attached on the leveling unit 2.

The leveling unit 2 has a leveling screw 33, and a leveling of the scanner main unit 3 is performed by the leveling screw 33.

The scanner main unit 3 comprises a fixed unit 4, frame unit 5, a horizontal rotation shaft 6, a horizontal rotation shaft bearing 7, a horizontal rotating motor 8 as a horizontal rotation driving component, a horizontal angle encoder 9 as a horizontal angle detecting component, a vertical rotation shaft 11, a vertical rotation shaft bearing 12, a vertical rotating motor 13 as a vertical rotation driving component, a vertical angle encoder 14 as a vertical angle detecting component, and a scanning mirror 15 which is a vertical rotation component, an operation panel 16 which also serves as an operation module and a display module, an arithmetic control component 17 which is represented by a CPU and a microprocessor, a storage component 18, a distance measuring component 19, and the like.

The horizontal rotation shaft bearing 7 is fixed on the fixed unit 4. The horizontal rotation shaft 6 has an axis 6a which is vertical, and the horizontal rotation shaft 6 is rotatably supported on the horizontal rotation shaft bearing 7. Further, the frame unit 5 is supported by the horizontal rotation shaft 6, and the frame unit 5 is arranged so as to rotate integrally with the horizontal rotation shaft 6 in a horizontal direction.

Between the horizontal rotation bearing 7 and the frame unit 5, the horizontal rotating motor 8 is provided, and the horizontal rotating motor 8 is controlled by the arithmetic control component 17. The arithmetic control component 17 makes the frame unit 5 rotates with the axis 6a as a center by the horizontal rotating motor 8.

A relative rotation angle of the frame unit 5 with respect to the fixed unit 4 is detected by the horizontal angle encoder 9. A detection signal from the horizontal encoder 9 is input to the arithmetic control component 17, and horizontal angle data is calculated by the arithmetic control component 17. The arithmetic control component 17 performs a feedback-control with respect to the horizontal rotating motor 8 based on the horizontal angle data.

Further, in the frame unit 5, the vertical rotation shaft 11 having an axis 11a which is vertical is provided. The vertical rotation shaft 11 is arranged so as to be rotatable via the vertical rotation shaft bearing 12. It is to be noted that an intersection point of the axis 6a and the axis 11a is an emitting point of a distance measuring light and an origin point of a coordinate system of the scanner main unit 3.

In the frame unit 5, a recessed portion 23 is formed. One end portion of the vertical rotation shaft 11 extends within the recessed portion 23, the scanning mirror 15 is fixedly attached on the one end portion, and the scanning mirror 15 is accommodated in the recessed portion 23. Further, the vertical angle encoder 14 is provided on the other end portion of the vertical rotation shaft 11.

The vertical rotating motor 13 is provided on the vertical rotation shaft 11, and the vertical rotating motor 13 is controlled by the arithmetic control component 17. The arithmetic control component 17 makes the vertical rotation shaft 11 rotates by the vertical rotating motor 13, and the scanning mirror 15 rotates with the axis 11a as the center.

A rotation angle of the scanning mirror 15 is detected by the vertical angle encoder 14, and a detection signal from the vertical angle encoder 14 is input to the arithmetic control component 17. The arithmetic control component 17 calculates vertical angle data of the scanning mirror 15 based on the detection signal and performs a feedback-control with respect to the vertical rotating motor 13 based on the vertical angle data.

Further, the horizontal angle data and the vertical angle data as calculated by the arithmetic control component 17, a measurement result, a distance between measuring points (to be described later) and an interval of measuring angles (to be described later) are stored in the storage component 18. Various memory means such as a HDD, a CD, a memory card, etc. are used as the storage component 18. The storage component 18 may be attachable and detachable with respect to the frame unit 5, or may be capable of sending data to an external storage device or an external data processing device via a communication means (not shown).

Various types of programs are stored in the storage component 18. These programs include: a program for carrying out a measurement (distance measurement, angle measurement), a program for controlling a light emission timing of a light emitting element 26, a program for acquiring point cloud data based on the measurement result, a program for selecting a measuring point, which fulfills a predetermined condition, from the point cloud data, a program for inputting data from the operation panel 16, a program for performing a setting or a calculation of a horizontal distance R, a mechanical height H, a fist distance between measuring points S1, a second distance between measuring points S2, a first interval of measuring angles Ae and a second interval of measuring angles Aa based on (Equation 1) and (Equation 2) to be described later, a program for calculating distributions of the first distance between measuring points S1 and the second distance between measuring points S2, and other programs.

Each type of programs as stored in the storage component 18 is carried out or opened by the arithmetic control component 17, and each type of processings in the present embodiment is carried out.

The operation panel 16 is a touch panel, for instance, and also serves as an operation module for performing an instruction of the distance measurement and changing a measurement condition, e.g., the distance between the measuring points, or the like, and a display module for displaying the measurement result, or the like.

Next, a description will be given on the distance measuring component 19.

A distance measuring light which is a pulsed light is emitted from the light emitting element 26, for instance a laser diode. The distance measuring light is emitted via a light projecting optical system 27 and a beam splitter 28. An optical axis of the distance measuring light as emitted from the beam splitter 28 is coincided with the axis 11a, and the distance measuring light is deflected at a right angle by the scanning mirror 15. By a rotation of the scanning mirror 15 with the axis 11a as the center, the distance measuring light is rotated (scanned) within a plane perpendicularly crossing the axis 11a and including the axis 6a.

The distance measuring light as reflected by an object to be measured (hereinafter referred as a "reflected distance measuring light") enters the scanning mirror 15, and is deflected by the scanning mirror 15. The reflected distance measuring light as deflected by the scanning mirror 15 is received by a photodetector 31, for instance an avalanche photodiode, via the beam splitter 28 and a photodetection optical system 29.

The distance measuring component 19 executes the distance measurement for each one pulse of the distance measuring light based on a time difference (i.e., a round trip time of the pulsed light) between a light emission timing of the light emitting element 26 and a photodetection timing of the photodetector 31 (Time of Flight). The light emitting element 26 can change the light emission timing, that is, a pulse interval.

It is to be noted that an internal reference optical system (not shown) is provided in the distance measuring component 19. The distance measuring component 19 performs the distance measurement based on a time difference between a photodetection timing of the distance measuring light, which is received by the internal reference optical system and the photodetection timing of the reflected distance measuring light. By performing the distance measurement based on the time difference between both of the photodetection timings, the distance measuring component 19 can perform the distance measurement with higher accuracy.

The frame unit 5 and the scanning mirror 15 rotates at a constant speed respectively, and the distance measuring light is scanned two-dimensionally by a cooperation between a rotation of the scanning mirror 15 in a vertical direction and a rotation of the frame unit 5 in a horizontal direction. Further, distance measurement data (slope distance) is acquired by the distance measurement for each pulsed light, and a vertical angle and a horizontal angle are detected for each pulsed light by the vertical angle encoder 14 and the horizontal angle encoder 9. As a result, the vertical angle data and the horizontal angle data can be acquired. Three-dimensional point cloud data corresponding to the object to be measured can be acquired based on the vertical angle data, the horizontal angle data and the distance measurement data.

Next, in FIG. 2 and FIG. 3, a description will be given on a change of the distance between the measuring points of when the point cloud data is acquired by the laser scanner 1.

Figure 2:
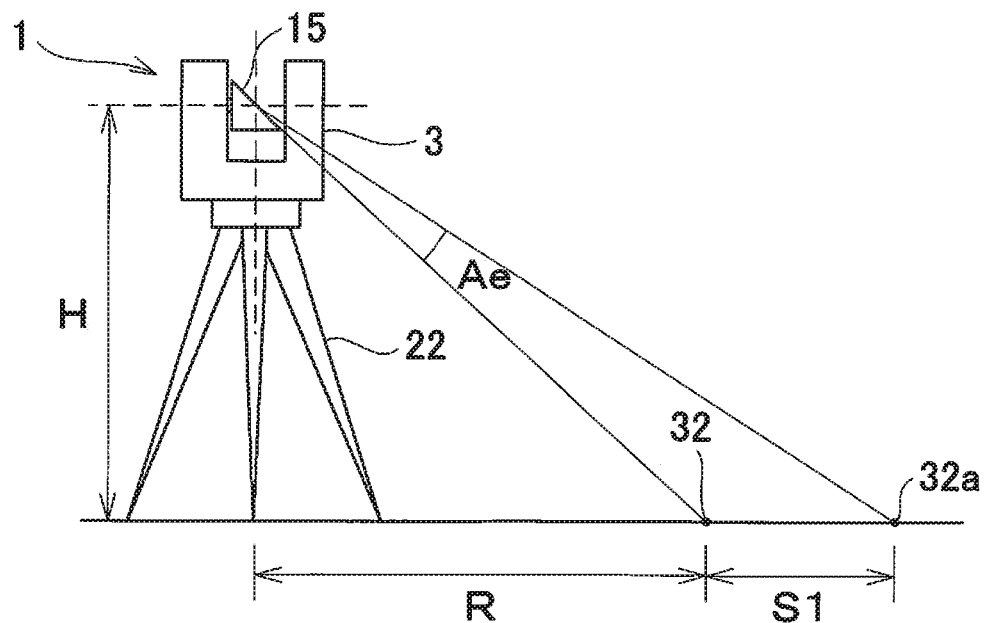
FIG. 2 is an explanatory drawing to explain a distance between measuring points and an interval of measuring angles in a radial direction.

FIG. 2 is an explanatory drawing to explain a distance between measuring points in a radial direction. It is to be noted that, in FIG. 2, although the laser scanner 1 faces the front with respect to a paper surface, the laser scanner 1 actually faces in a direction parallel to the paper surface.

In a case where the distance between the measuring points in the radial direction is set, for instance, with reference to a measuring point 32 on a plane to be measured such as a ground surface, a load surface, or the like at a distance as desired from the laser scanner 1, an interval between the measuring point 32 and a measuring point 32a adjacent to a direction apart from the laser scanner 1 along the radial direction is set.

Here, as shown in FIG. 2, a mechanical height (height from an installation point to an emitting point (rotation center of the scanning mirror 15) of the distance measuring light) of the laser scanner 1 is determined as "H", a horizontal distance (distance from the installation point to the measuring point 32) from the laser scanner 1 to the distance measuring point 32 is determined as "R", and a distance (distance between radial measuring points) between the measuring points 32 and 32a, that is, a first distance between measuring points, is determined as "S1". In this case, an interval of measuring angles (rotation angle pitch of the scanning mirror 15) in the radial direction, which is a difference of the vertical angle of the scanning mirror 15, of when the distance between the measuring point 32 and the measuring point 32a is measured, that is, a first interval of measuring angles Ae, can be expressed by the following equation:

$$Ae = \tan^{-1}((S1+R)/H) - \tan^{-1}(R/H) \quad \text{(Equation 1)}$$

The mechanical height H is actually measured by an operator and is input via the operation panel 16. By inputting the mechanical height H of which height with respect to the plane to be measured becomes known and by inputting a horizontal distance as desired and the first distance between measuring points S1 via the operation panel 16, the arithmetic control component 17 can calculate the first interval of measuring angles Ae at which the distance between the measuring points becomes S1 at the measuring point 32 by (Equation 1).

Figure 3:
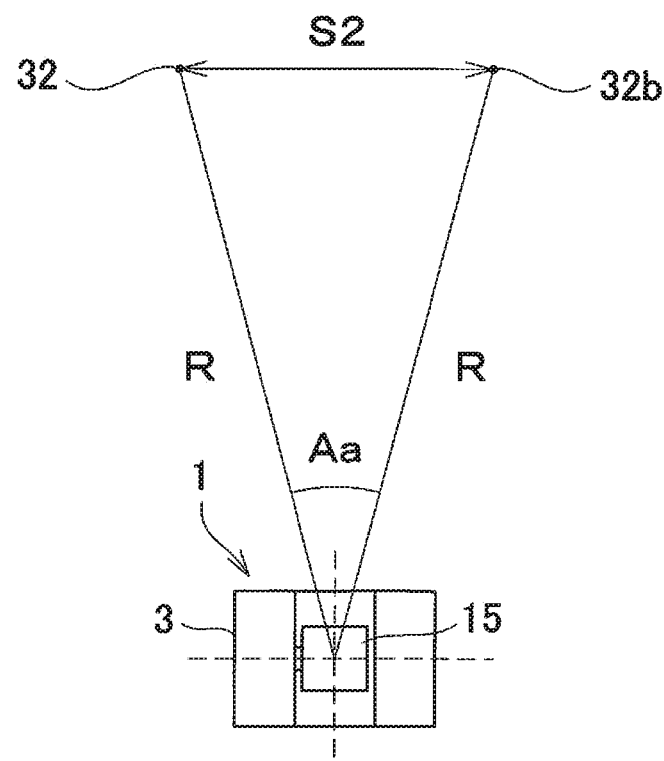
FIG. 3 is an explanatory drawing to explain a distance between measuring points and an interval of measuring angles in a circumferential direction.

FIG. 3 is an explanatory drawing to explain a distance between measuring points in a circumferential direction and shows a state where the laser scanner 1 is seen from an upper surface. In a case where the distance between the measuring points in the circumferential direction is set, for instance, with reference to the measuring point 32 on a plane to be measured at a distance as desired from the laser scanner 1, an interval between the measuring point 32 and a measuring point 32b adjacent along the circumferential direction is set.

Here, as shown in FIG. 3, the horizontal distance from the laser scanner 1 to the distance measuring point 32 is determined as "R", and a distance between the measuring points 32 and 32b (distance between circumferential measuring points), that is, a second distance between measuring points is determined as "S2". In this case, an interval of measuring angles (rotation angle pitch of the frame unit 5) in the circumferential direction, which is a difference of a horizontal angle of the frame unit 5, of when the distance between the measuring point 32 and the measuring point 32b is measured, that is, a second interval of measuring angles Aa, can be expressed by the following equation:

$$Aa = 2 \times \sin^{-1}(S2/(2 \times R)) \quad \text{(Equation 2)}$$

The horizontal distance R between the laser scanner 1 and the measuring point 32 is calculated similarly to FIG. 2. Further, by inputting the second distance between measuring points S2 via the operation panel 16, the arithmetic control component 17 can calculate the second interval of measuring angles Aa at which the distance between the measuring points becomes S2 at the measuring point 32 by (Equation 2).

Figure 4:
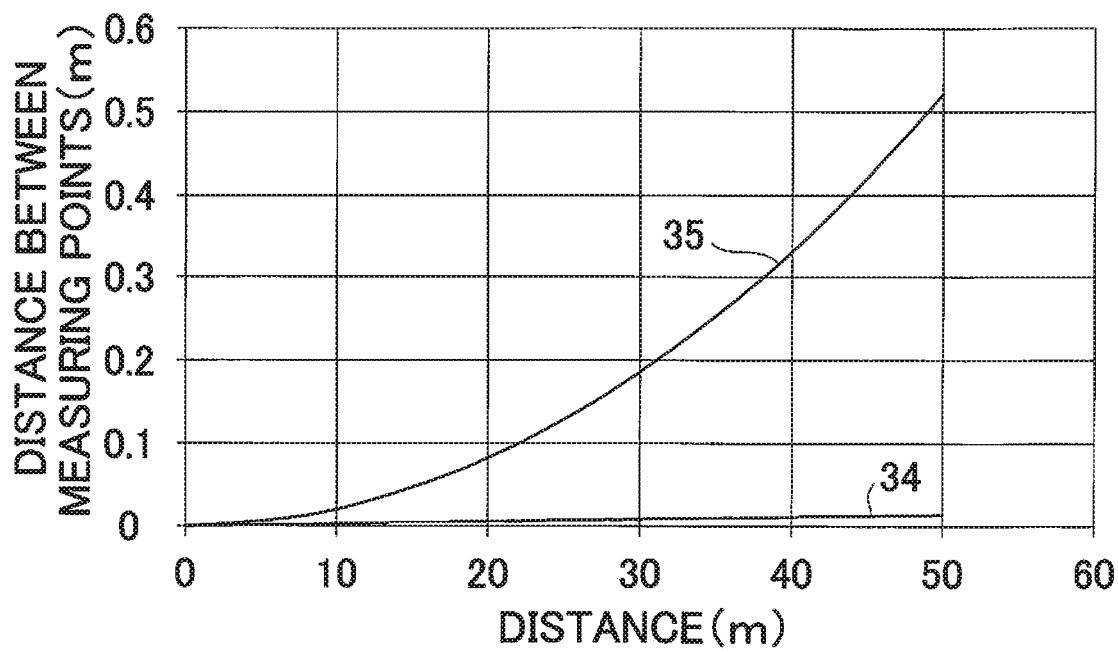
FIG. 4 is a graph to show the distance between the measuring points in the radial direction and the distance between the measuring points in the circumferential direction in a case where the interval of the measuring angles in the radial direction and the interval of the measuring angles in the circumferential direction are coincided with each other.

FIG. 4 is a graph to show distributions of the first distance between measuring points S1 and the second distance between measuring points S2 in a case where the mechanical height H of the laser scanner 1 is set 1.5 m and both of the first interval of measuring angles Ae and the second interval of measuring angles Aa are set 0.31 milliradians, as an example. It is to be noted that in the graph of FIG. 4, an axis of ordinate represents an interval of adjacent measuring points, and an axis of abscissa represents a distance from the laser scanner 1 to the measuring point 32. Further, in FIG. 4, a reference numeral 34 denotes a straight line showing a distribution of the second distance between measuring points S2, and a reference numeral 35 denotes a curved line showing a distribution of the first distance between measuring points S1.

As shown in FIG. 4, while the second distance between measuring points S2 extends by a linear function in proportion to the distance from the laser scanner 1 in the straight line 34, the first distance between measuring points S1 extends by a quadratic function in the curved line 35. Therefore, a difference between the first distance between measuring points S1 and the second distance between measuring points S2 becomes larger as the distance from the laser scanner 1 to the measuring point 32 becomes longer.

For instance, in a case where the measuring point 32 is positioned 22 m from the laser scanner 1, that is, in a case where the horizontal distance R is 22 m, the first distance between measuring points S1 is approximately 0.1 m, and the second distance between measuring points S2 is 0.0062 m.

As described above, in a case where the first interval of measuring angles Ae and the second interval of measuring angles Aa are coincided with each other, at a position away from the laser scanner 1, the second distance between measuring points S2 becomes greatly dense as compared with the first distance between measuring points S1. Therefore, it takes time to acquire the point cloud data, and a calculation load is increased.

Further, in a postprocessing process after acquiring the point cloud data, since a measuring point which does not satisfy a distance between measuring points as desired are deleted, and various processings are performed using point cloud data which becomes the distance between the measuring points as desired, there are a lot of wastes.

For this reason, in the present embodiment, the second distance between measuring points S2 of the measuring point 32 which is at a distance as desired from the laser scanner 1 is set the same value or approximately same value with the first distance between measuring points S1, the number of point cloud data to be acquired is decreased, and a reduction in a time for acquiring the point cloud data and a reduction in the calculation load in the arithmetic control component 17 are realized.

Figure 5:
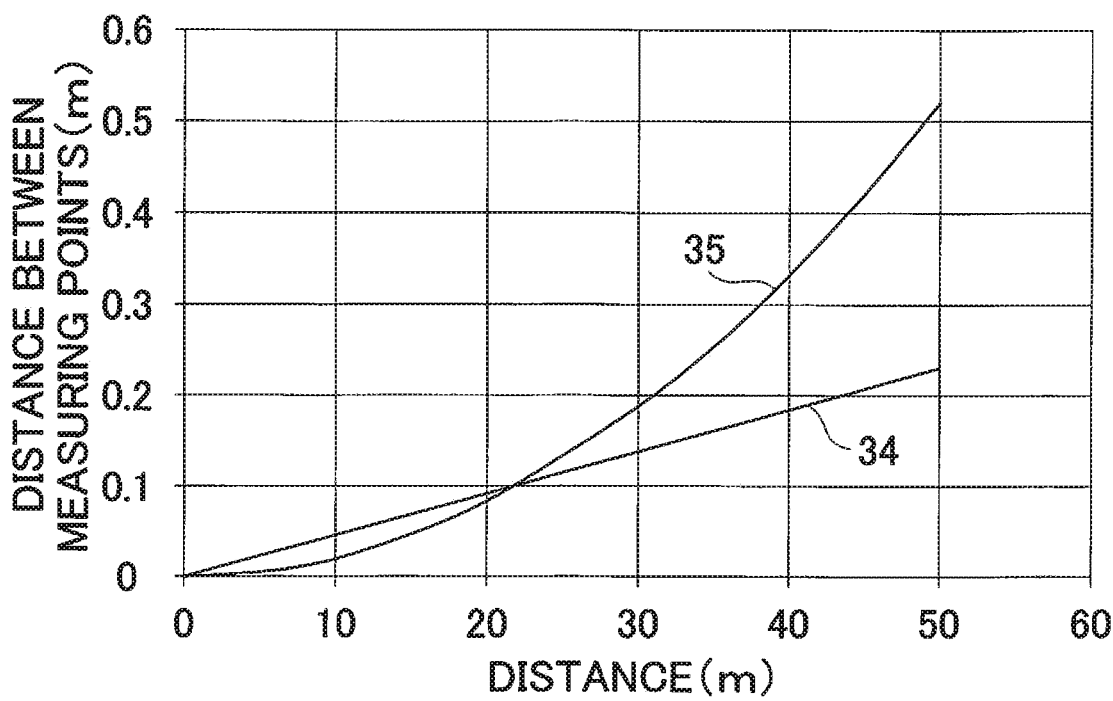
FIG. 5 is a graph to show the distance between the measuring points in the radial direction and the distance between the measuring points in the circumferential direction in a case where the interval of the measuring angles in the radial direction and the interval of the measuring angles in the circumferential direction are set differently from each other.

FIG. 5 is a graph to show distributions of the first distance between measuring points S1 and the second distance between measuring points S2 in a case where the second distance between measuring points S2 is set approximately 0.1 m equally to the first distance between measuring points S1 at the measuring point 32 which is positioned 22 m from the laser scanner 1.

The second interval of measuring angles Aa at this time can be calculated by substituting 22 m into the horizontal angle R of (Equation 2) and 0.1 m into the second distance between measuring points S2 of (Equation 2). The second interval of measuring angles Aa at this time becomes 4.6 milliradians.

As described above, in the measuring point 32 away 22 m from the laser scanner 1, by coinciding the second distance between measuring points S2 with the first distance between measuring points S1, the number of the point cloud data to be acquired is decreased to 1/14.8.

It is to be noted that in a case where the point cloud data is acquired, the frame unit 5 and the scanning mirror 15 is controlled so as to rotate at a constant speed at different speeds respectively by the arithmetic control component 17. Therefore, an interval of the distance measurement data as acquired at each of the measuring points is determined by the light emission timing of the light emitting element 26 as controlled by the arithmetic control component 17. Alternatively, it may be so arranged that a measurement result which is from a distance measuring light as emitted at an interval of measuring angles less than the first interval of measuring angles Ae and the second interval of measuring angles Aa is discarded by an internal processing by the arithmetic control component 17.

It is to be noted that a curved shape of the curved line 35 is determined by the mechanical height H of the laser scanner 1 and the first interval of measuring angles Ae and is calculated by the arithmetic control component 17. Since the mechanical height H is approximately constant in general, the first interval of measuring angles Ae is changed in a case where the curved shape of the curved line 35 is changed. Further, a linear shape (tilting) of the straight line 34 is determined by the second interval of measuring angles Aa and is calculated by the arithmetic control component 17.

By changing the first interval of measuring angles Ae, the first distance between measuring points S1 as desired can be obtained at the measuring point 32 which is at the distance as desired. Further, by changing the second interval of measuring angles Aa, the second distance between measuring points S2 as desired can be obtained at the measuring point 32 which is at the distance as desired.

In the present embodiment, the arithmetic control component 17 selects a measuring point which is at the distance as desired from the laser scanner 1. The arithmetic control component 17 calculates the first interval of measuring angles Ae at which the first distance between measuring points S1 as set in advance can be obtained based on the horizontal distance R to the measuring point as selected and the mechanical height H. Thereafter, the arithmetic control component 17 sets a slope of the straight line 34 so that the straight line 34 crosses the curved line 35 at the measuring point. Thereby, the arithmetic control component 17 can obtain the second interval of measuring angles Aa of when the first distance between measuring points S1 and the second distance between measuring points S2 become equal at the measuring point as selected.

Alternatively, the first interval of measuring angles Ae is fixed at an angle as set in advance, and the arithmetic control component 17 calculates a distribution of measuring points which exist along the radial direction based on the mechanical height H and the first interval of measuring angles Ae. Further, the arithmetic control component 17 selects a measuring point at which the first distance between measuring point S1 as set in advance can be obtained from each of the measuring points obtained by the calculation. Finally, the arithmetic control component 17 sets the slope of the straight line 34 so that the straight line 34 crosses the curved line 35 at the measuring point as selected. Thereby, the arithmetic control component 17 may obtain the second interval of measuring angles Aa of when the first distance between measuring points S1 and the second distance between measuring points S2 become equal at the measuring point as selected.

It is to be noted that there is no need to always coincide a relationship between the first distance between measuring points S1 and the second distance between measuring points S2, and the relationship between the first distance between measuring points S1 and the second distance between measuring points S2 is appropriately set depending on a purpose of use of the point cloud data, or the like. For instance, the second distance between measuring points S2 may be set so as to become half of the first distance between measuring points S1 at the measuring point as selected.

In this case, the arithmetic control component 17 sets the slope of the straight line 34 so that the straight line 34 passes a point at which the distance between the measuring points becomes half of the curved line 35 at the measuring point as selected. Thereby, the arithmetic control component 17 can obtain the second interval of measuring angles Aa of when the second distance between measuring points S2 becomes half of the first distance between measuring points S1 at the measuring point as selected.

As describe above, in the present embodiment, the arithmetic control component 17 selects the measuring point 32 which is at the distance as desired from the laser scanner 1, sets the first interval of measuring angles Ae at which the first distance between measuring points S1 as set in advance can be obtained based on the horizontal distance R to the measuring point 32 and the mechanical height H, and sets the second interval of measuring angles Aa so as to enable to obtain the second distance between measuring points S2 as set in advance, that is, the same or approximately same second distance between measuring points S2 with the first distance between measuring points S1 at the measuring point 32.

Therefore, a density of point cloud data in the circumferential direction is decreased, and the number of data to be acquired is greatly reduced. As a result, a time for acquiring the point cloud data and a calculation load in the arithmetic control component 17 are reduced, and a processing time from a start of the distance measurement to an acquisition of the point cloud data enables to be greatly shortened.

Further, at the measuring point 32 as selected, only data of a measuring point which satisfies the second distance between measuring points S2 as set is acquired by the arithmetic control component 17, and there is no need to exclude the measuring point which does not satisfy the second distance between measuring points S2 in the post-processing process. As a result, a reduction in a processing process can be realized, a reduction in a processing time and an improvement in a workability can be realized.

It is to be noted that in the present embodiment, although the mechanical height H of the laser scanner 1 is actually measured by the operator and is input via the operation panel 16, and the calculation is performed by the arithmetic control component 17 in a known state, the arithmetic control component 17 may automatically obtain the mechanical height H. For instance, in a case where the plane to be measured is horizontal, the arithmetic control component 17 can calculate the mechanical height H (relative height h, see FIG. 6) and the horizontal distance R based on distance measurement data (slope distance) and vertical angle data of when a distance measurement of one arbitrary point (measuring point 32 in FIG. 6) is performed by the laser scanner 1. Further, the arithmetic control 17 can calculate the first interval of measuring angles Ae and the second interval of measuring angles Aa based on the mechanical height H and the horizontal distance R as calculated.

Figure 6:
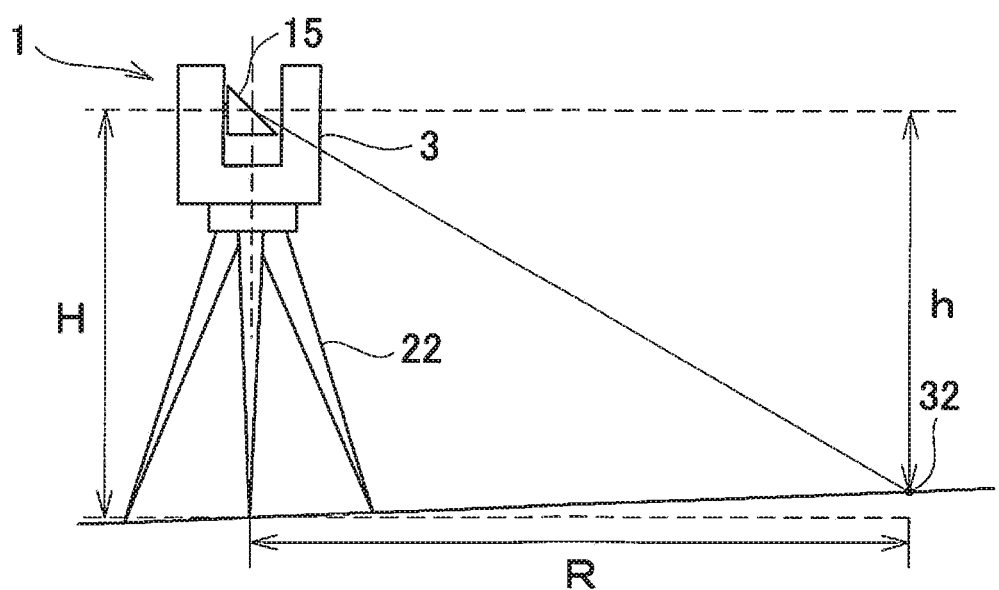
FIG. 6 is an explanatory drawing to explain a mechanical height and a relative height in a case where a plane to be measured is tilted.

Further, as shown in FIG. 6, in a case where the plane to be measured is tilted, the arithmetic control component 17 can calculate a height of the emitting point of the distance measuring light of the laser scanner 1 with respect to the measuring point 32, that is, the relative height h and the horizontal distance R based on distance measurement data (slope distance) and vertical angle data of when the arbitrary measuring point 32 is measured. Further, the arithmetic control component 17 can calculate the first interval of measuring angles Ae and the second interval of measuring angles Aa based on the relative height h and the horizontal distance R as calculated. It is to be noted that the arithmetic control component 17 can similarly calculate if the plane to be measured is a plane surface.

Further, even in a case where the plane to be measured is tiled, the arithmetic control component 17 can obtain the relative height h and the horizontal distance R at each of the measuring points respectively based on a slope distance for each of the measuring points and at least the vertical angle of the scanning mirror 15 by rotating the frame unit 5 horizontally and the scanning mirror 15 vertically and by scanning the plane to be measured with the distance measuring light. The arithmetic control component 17 can calculate a tilting (approximate shape) of the plane to be measured and calculate the mechanical height H based on a difference between the relative height h and the horizontal distance R between each of the measuring points adjacent in the radial direction.

Further, in the present embodiment, although the arithmetic control component 17 selects the measuring point 32 which is at the distance as desired, sets the second distance between measuring points S2 corresponding the first distance between measuring points S1 of the measuring point 32 as selected, and reduces the number of data in the circumferential direction, a reduction in data in the radial direction may be further realized. For instance, at a measuring point at which the first distance between measuring points S1 does not satisfy a set value, the arithmetic control component 17 is configured so as not to acquire data. Thereby, there is no need to exclude data of the measuring point at which the first distance between measuring points S1 does not satisfy the set value in the postprocessing process, and a postprocessing amount can be further reduced.

Further, in the present embodiment, although the arithmetic control component 17 sets the first distance between measuring points S1 and the second distance between measuring points S2 and calculates the first interval of measuring angles Ae and the second interval of measuring angles Aa after the mechanical height H as actually measured is input from the operation panel 16 or after the arithmetic control component 17 calculates the mechanical height H, the arithmetic control component 17 may be configured to perform a series of processings once.

For instance, the first interval of measuring angles Ae and the first distance between measuring points S1 are arbitrary set by the operation panel 16, the second distance between measuring points S2 is set so as to coincide or approximately coincide with the first distance between measuring points S1, and the processings are started. The arithmetic control component 17 rotates the scanning mirror 15 one round or a few rounds and scans the distance measuring light in the radial direction. The arithmetic control component 17 selects a measuring point which satisfies the first distance between measuring points S1 as set in advance based on measurement results at each of the measuring points. Further, the arithmetic control component 17 may select a measuring point which is at a horizontal distance as desired as set from each of the measuring points and may calculate the first interval of measuring angles Ae which satisfies the first distance between measuring points S1 at the measuring point.

The arithmetic control component 17 calculates the second interval of measuring angles Aa which satisfies the second distance between measuring points S2 as set in advance at the measuring point as selected. The arithmetic control component 17 acquires point cloud data of the plane to be measured based on the first interval of measuring angles Ae as set and the second interval of measuring angles Aa as calculated.

In such a manner as described above, an instruction by the operator such as a start of a measurement, or the like is finished only once, and the workability is improved.

It is to be noted that in the preset embodiment, the arithmetic control component 17 calculates the first interval of measuring angles Ae and the second interval of measuring angles Aa which satisfy the first distance between measuring points S1 and the second distance between measuring points S2 as set in advance at the measuring point 32 which is positioned at the distance as desired. On the other hand, it is needless to say that the first interval of measuring angles Ae may be fixed, and the arithmetic control component 17 may select the measuring points 32 which satisfy the first distance between the measuring points S1 as set in advance.

The invention claimed is:

1. A laser scanner comprising: a distance measuring component for emitting a distance measuring light to a plane to be measured and for measuring a distance to a measuring point which said measuring light is emitted to, a frame unit which horizontally rotates around a horizontal rotation shaft as a center of rotation by a horizontal rotating motor, a scanning mirror of which height with respect to said plane to be measured is known and which is provided in said frame unit rotatably in a vertical direction around a vertical rotation shaft as the center of rotation and scans said distance measuring light by rotating vertically by a vertical rotating motor, a horizontal angle detecting component for detecting a horizontal angle of said frame unit, a vertical angle detecting component for detecting a vertical angle of said scanning mirror and an arithmetic control component for controlling when a distance measurement is performed by said distance measuring component and a rotation of said frame unit and a rotation of said scanning mirror, wherein said arithmetic control component sets a predetermined distance between adjacent measuring points in a radial direction as a first distance between measuring points, sets a predetermined distance between adjacent measuring points in a circumferential direction as a second distance between measuring points, calculates a first interval of measuring angles at which a distance between said measuring points adjacent along the radial direction becomes said first distance between said a measuring point and an adjacent measuring point based on a height of said scanning mirror, a horizontal distance to said measuring point as desired and said first distance, calculates a second interval of measuring angles at which a distance between said measuring points adjacent along the circumferential direction becomes said second distance between said measuring point and an adjacent measuring point based on said height of said scanning mirror, and a horizontal distance to said distance measuring point as desired and said second distance between measuring points, emits said distance measuring light by horizontally rotating said frame unit and vertically rotating said scanning mirror and acquires point cloud data of said plane to be measured based on said first interval of measuring angles and said second interval of measuring angles.

2. The laser scanner according to claim 1, wherein said arithmetic control component makes said distance measuring component emit said distance measuring light to one arbitrary point on said plane to be measured and calculates said height of said scanning mirror with respect to said one arbitrary point based on a slope distance to said one arbitrary point and the vertical angle of said scanning mirror.

3. The laser scanner according to claim 2, wherein said first distance between measuring points and said second distance between measuring points at said measuring point as selected are coincided or approximately coincided with each other.

4. The laser scanner according to claim 1, wherein said arithmetic control component controls the rotation of said scanning mirror, scans said distance measuring light with respect to said plane to be measured, calculates said height of said scanning mirror and said horizontal distance with respect to each of said measuring points respectively based on a slope distance and at least the vertical angle of said scanning mirror for each of said measuring points and calculates an approximate shape of said plane to be measured based on said height of said scanning mirror and said horizontal distance for each of said measuring points.

5. The laser scanner according to claim 4, wherein said first distance between measuring points and said second distance between measuring points at said measuring point as selected are coincided or approximately coincided with each other.

6. The laser scanner according to claim 2, wherein said arithmetic control component is configured so as not to acquire data of said measuring point which does not satisfy said first distance between measuring points.

7. The laser scanner according to claim 4, wherein said arithmetic control component is configured so as not to acquire data of said measuring point which does not satisfy said first distance between measuring points.

8. The laser scanner according to claim 1, wherein said first distance between measuring points and said second distance between measuring points at said measuring point as selected are coincided or approximately coincided with each other.

9. The laser scanner according to claim 1, wherein said arithmetic control component is configured so as not to acquire data of said measuring point which does not satisfy said first distance between measuring points.

\* \* \* \* \*